March 29, 1932.    H. S. JOHNS    1,851,910
BAG FILLING MACHINE
Filed May 12, 1931
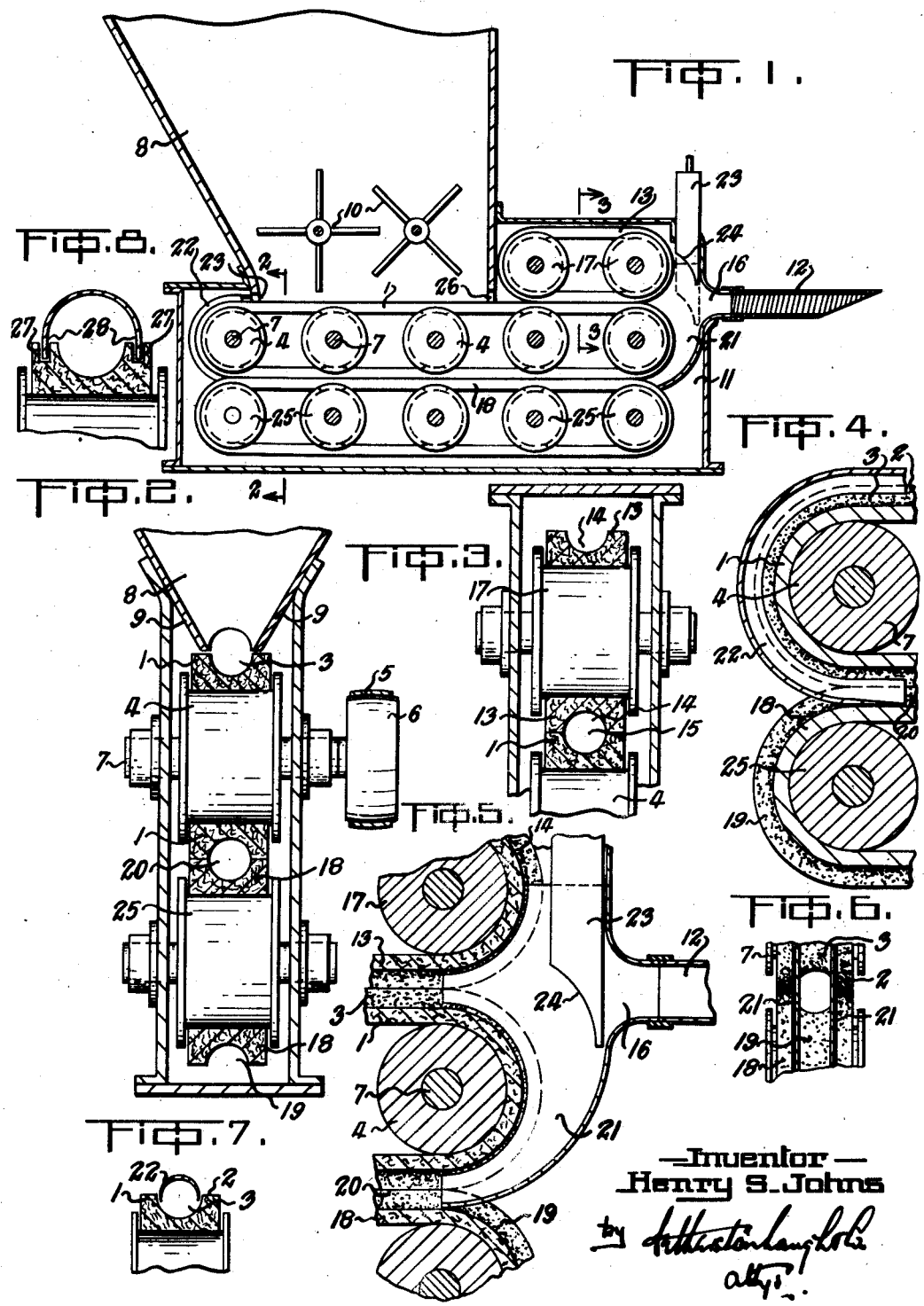

Patented Mar. 29, 1932

1,851,910

UNITED STATES PATENT OFFICE

HENRY STINSON JOHNS, OF GRIMSBY TOWNSHIP, LINCOLN COUNTY, ONTARIO, CANADA, ASSIGNOR TO BANCROFT HOLDINGS LIMITED, OF HAMILTON, ONTARIO, CANADA, A CORPORATION OF ONTARIO

BAG FILLING MACHINE

Application filed May 12, 1931. Serial No. 536,706.

My invention relates to improvements in bag filling machines and the object of my invention is to construct a machine incorporating a plurality of conveyer belts which will handle all types of loose material whether in granular or finely powdered form without injury to, or caking of, the material, and also without raising the temperature of the material to any injurious degree.

A further and particular object of my invention is to construct a very simple machine which will fill bags with great rapidity, and a still further object of my invention is to so construct my machine that, when running, the material being fed is in constant non-pulsating movement irrespective of whether a bag is being filled or the passage of material through the ejection or the feed nozzle momentarily cut off for the reception of a fresh bag.

My invention consists of a bag filling machine constructed and arranged all as hereinafter more particularly described and illustrated in the accompanying drawings in which:—

Fig. 1 is a longitudinal vertical sectional view through my machine, such figure being of reduced size in proportion to the other figures of the drawings.

Fig. 2 is a cross sectional view taken through the line 2—2, Figure 1.

Fig. 3 is a vertical cross sectional view taken through a fragmentary portion of the machine through the line 3—3, Figure 1.

Fig. 4 is a longitudinal cross sectional view through two rear end pulleys and conveyer belts of my machine.

Fig. 5 is a similar view to Figure 4 through the forward end pulleys and conveyer belts of my machine, and also showing my material deflecting gate valve.

Fig. 6 is a vertical cross sectional view showing a fragmentary portion of the pulleys and belts illustrated in Figure 5.

Fig. 7 is a cross sectional view through the belt and material channel which passes around the rear upper pulley, and Fig. 8 is a similar view to Figure 7, showing an alternative form of construction.

Like characters of reference indicate corresponding parts in the different views in the drawings.

In carrying out my invention I incorporate a belt conveyer in my machine, such conveyer passing underneath the material hopper at a high speed and adapted to deliver the material which drops thereon from the hopper, through a delivery or ejection nozzle, and in carrying out the invention I have formed the outer or material receiving face of this belt with a continuous groove in which the material is contained, and have also furnished a secondary belt position exteriorly of the hopper and superimposed upon the upper face of the conveyer belt, the outer face of such secondary belt being formed with a groove similar to the groove in the conveyer belt whereby such grooves form a moving passage-way in which the material is carried and from which it is ejected from the machine.

In the drawings 1 is the main conveyer belt which can be made of any suitable material, such as rubber or leather, and formed in its outer face 2 with a continuous groove 3. The belt 1 is carried upon a plurality of pulleys 4 which are rotated in any suitable manner, such as by a driving belt 5 passing over driving pulleys 6 positioned exteriorly of the machine and carried upon spindles 7 upon which the pulleys 4 are mounted.

The belt 1 passes underneath the lower open end of a hopper 8, the sides 9 of such hopper converging inwardly to the groove 3 as illustrated in Figure 2, so that the material contained in the hopper falls into the groove in the belt. In order to prevent the material contained in the hopper from arching over the conveyer belt as it passes downwardly in being fed thereon I furnish any suitable agitator means such as rotary blade members 10 which are driven in conjunction with the belt 1.

The belt 1 is contained within a casing 11 positioned underneath the hopper and extending forwardly thereof, such casing being furnished with a delivery nozzle 12 which merges from the forward end thereof and is in alignment with the groove 3 in the belt 1. The nozzle 12 can be formed of a solid piece of piping as illustrated in Figure 5, or made up of flexible form as illustrated in Figure 1, whereby the nozzle bends downwardly to a slight degree as the bag contracts in height upon the entry of the material thereinto.

Superimposed upon the upper portion of the belt 1 extending exteriorly of the hopper 8 I furnish a second belt 13 of similar form to the belt 1, a groove 14 in the outer face of such belt coinciding with the groove 3 in the belt 1, so that a moving passage-way 15 is formed, such passage-way being in alignment with the inner open end 16 of the nozzle 12. The belt 13 is carried upon a pair of suitably positioned pulleys 17.

Underneath and in contact with the belt 1 I furnish a similar third belt 18 carried upon a plurality of pulleys 25 and having a groove 19 in its outer face, such groove 19 coinciding with the groove 3 and forming a continuous moving passage 20 extending from the front to the rear end of the casing 11. The third belt 18 forming the moving passage 20 in conjunction with the belt 1 is provided as a means for returning the material which has not been ejected through the nozzle 12 back into the hopper 8, and to attain this end I position a downwardly and a rearwardly curved trough member 21 in the forward end of the casing 11, such trough member extending from the entrance 16 to the nozzle 12 into the forward end of the moving passage-way 20 so that the material ejected from the moving passage-way 15 and not out through the nozzle 12 is carried downwardly through the trough member 21 into the moving passage-way 20. In the rear end of the casing I provide a second trough member 22 which extends around the rear end pulley 4 of the belt 1, from the passage-way 20 to an orifice 123 in the bottom of the rear end of the hopper, the trough member 22 and groove 3 in the belt 1 forming a passage through which the material passes back into the hopper.

In Figures 4, 5, 6 and 7 of the drawings the sides of the trough members 21 and 22 are shown extending into the grooves in the belts rather than merely to the faces, to prevent leakage. If, however, my machine is designed to handle fine material wherein there is a greater possibility of leakage around the edges of the trough members, I form the faces of the belts with a pair of trough edge receiving grooves 27 positioned between the sides of the belt and the material carrying groove. The edges 28 of the troughs extend into the grooves.

For controlling the passage of material from the belts 1 and 13 through the nozzle 12 so that it is not necessary to stop the machine every time a bag is being changed, I furnish a gate valve 23 which has a vertical sliding movement in the casing 11 and when in the downward position closes the open end of the entrance 16 to the nozzle 12. The lower inner face of the gate valve 23 is formed with a curved portion 24, so that when the valve is in the position illustrated in Figure 5 the material ejected from the moving passage 15 is deflected downwardly into the trough 21 through the medium of such curved portion 24. The gate valve 23 can be actuated in any suitable manner and in practice I couple the actuating mechanism of the valve to the bag weighing mechanism so that the valve immediately closes when a predetermined weight of material has been fed into the bag.

When my machine is in operation the endless conveyer belt 1 rotates in a clockwise direction and the material in the hopper 8 which rests in the groove 3 in the belt is carried forward through an orifice 26.

As the belt 13 is superimposed upon the forward end of the belt 1 so that its groove 14 coincides with the groove 3, such grooves form a moving passage 15 along which the material is carried and from whence it is ejected into the nozzle 12 as the belts separate in passing around the respective end pulleys 4 and 17, it being understood that the belt 1 is traveling at a very high rate of speed. The belts 13 and 18 can be either driven by a suitable driving arrangement exteriorly of the machine, or as I have found in practice the engagement of the belt 1 with such belts 13 and 18 is sufficient to carry them around.

When the machine is in operation the filled bags are immediately replaced by empty bags, either by hand or through mechanical means, and I therefore furnish the gate valve 23 for cutting off the passage of material through the nozzle 12 when the bags are being replaced. In order to avoid any backing up of the material in my machine, and also to reduce the time consumed in starting and stopping the stream of material through the nozzle I as previously described, have so arranged the gate valve that when in its downward position it deflects the flow of material issuing from the passage 15 in a downward direction into the moving passage 20 from whence it passes through the trough 22 and back into the hopper through the orifice 123.

I have found my machine in practice to be extremely fast and efficient and have also demonstrated that it can be used for handling all classes of granular or powdered materials, and although my drawings illustrate the machine in its simplest form, it is to be understood that it is susceptible to many changes without departing from the basic principle of my invention.

For example, where it is so desired the rear end of the casing 11 may be furnished with a second bag filling nozzle 12 positioned in alignment with the end of the lower moving passage 20, the actuation of the valve 23 of such second nozzle alternating with the actuation of the valve 23 shown, so that one bag at one end of the machine would be filling whilst the bag at the other end of the machine was being replaced. The grooves in the belts may be also furnished with spaced apart transverse partitions to prevent any possibility of the material sliding along the grooves, and also if preferred a single continuous endless belt may be used in lieu of the three belts shown and described, such belt being carried around into the various positions through a suitable arrangement of pulleys, and therefore although I have shown and described a particular embodiment of my invention it is to be understood that I can make such changes and alterations as I may from time to time deem necessary without departing from the spirit of my invention as set forth in the appended claims.

What I claim as my invention is:

1. In a bag filling machine, the combination with a material containing hopper and a material delivery nozzle extending from the machine, of an endless conveyer belt positioned underneath the hopper in contact with the material and extending to proximity with the inner end of the nozzle, adjustable material deflecting means positioned between the belt and the nozzle, and means for returning deflected material back into the hopper.

2. In a bag filling machine, the combination with a material containing hopper and a material delivery nozzle extending from the machine, of an endless conveyer belt having a groove in its outer face positioned underneath the hopper in contact with the material and extending to proximity with the inner end of the nozzle, a second belt having a groove in its outer face and superimposed upon the outer face of the first belt so that the grooves in the belts form a moving material containing passage-way, adjustable material deflecting means positioned between the belt and the nozzle and means for returning the deflected material back into the hopper.

3. In a bag filling machine, the combination with a material containing hopper and a material delivery nozzle extending from the machine, of an endless conveyer belt having a groove in its outer face positioned underneath the hopper in contact with the material and extending to proximity with the inner end of the nozzle, a second belt having a groove in its outer face and superimposed upon the outer face of the first belt so that the grooves in the belts form a moving material containing passage-way, a third belt in contact with the first conveyer belt and having a groove in its outer face and extending parallel with the lower portion of the first belt so that the grooves in the belts form a moving material containing return passage-way, a trough extending from the vicinity of the nozzle to the passage-way formed by the first and third belts, a second trough extending from said passage-way to the hopper and adjustable material deflecting member positioned at the juncture of the first trough and the nozzle.

4. In a bag filling machine, the combination with a material containing hopper and a material delivery nozzle extending from the machine, of an endless conveyer belt having a groove in its outer face positioned underneath the hopper in contact with the material and extending to proximity with the inner end of the nozzle, a second belt having a groove in its outer face superimposed upon the outer face of the first belt so that the grooves in the belts form a moving material containing passage-way, a third belt having a groove in its outer face and extending in contact with the first belt to form a return moving passage-way to the material containing hopper, and adjustable means for deflecting the fed material into the return passage-way.

5. In a bag filling machine, the combination with a material containing hopper and a material delivery nozzle extending from the machine, of an endless belt extending into the hopper in contact with the material contained therein and constituting moving passage-way in which material is carried from the hopper to the nozzle and also returned from the nozzle to the hopper.

6. In a bag filling machine, the combination with a material containing hopper and a material delivery nozzle extending from the machine, of an endless conveyor belt having a groove in its outer face positioned to receive material from the hopper and extending into proximity with the inner end of the nozzle, and a second belt also extending into proximity with the inner end of the nozzle and having a groove in its outer face, the outer faces of both belts being in contact with each other so that the grooves in the belts are complementary and form a moving material containing passage-way.

7. In a bag filling machine, the combination with a material containing hopper and a material delivery nozzle extending from the machine, of an endless conveyor belt positioned to receive material from the hopper and to deliver such material towards the nozzle, adjustable deflecting means positioned within the path of the delivered material, and means for returning deflected material back into the hopper.

8. In a bag filling machine, the combination with a material containing hopper and a material delivery nozzle extending from the machine, of an endless conveyor belt having a groove in its outer face positioned underneath the hopper in contact with the material and extending to proximity with the inner end of the nozzle, a second belt having a groove in its outer face and positioned in relation to the upper face of the first belt whereby the grooves in the belts form sides of a moving material containing passage-way, a third belt also having a groove in its outer face and so positioned in relation to the under portion of the first belt that the grooves in the belts form sides of a second moving material passage-way, a conduit extending from the vicinity of the nozzle to one end of the second passage-way, another conduit extending from the other end of the second passage-way to the hopper, and adjustable means for controlling the passage of material along the second passage-way.

9. In a bag filling machine, the combination with a material containing hopper and a material delivery nozzle extending from the machine, and of an endless conveyor belt having a groove in its outer face positioned underneath the hopper in contact with the material and extending to proximity with the inner end of the nozzle, a moving material containing passage-way from the hopper to the nozzle, a second belt positioned in relation to the first belt to form therewith sides of the moving passage-way, a second moving material containing passage-way, a third belt positioned in relation to the lower portion of the first belt to form therewith sides of the second moving passage-way, a conduit extending from the vicinity of the nozzle to one end of the second passage-way and another conduit extending from the other end of the second passage-way to the hopper, and adjustable means for controlling the passage of material along the second passage-way.

10. In a bag filling machine, the combination with a material containing hopper and a material delivery nozzle extending from the machine, of an endless conveyor belt positioned to receive material from the hopper and to deliver such material towards the nozzle, a moving material containing passage-way to the nozzle, a second belt positioned in relation to the first belt and forming a side of the moving passage-way, a second moving material containing passage-way, a third belt positioned in relation to the lower portion of the first belt and forming a side of the second moving passage-way, a conduit extending from the vicinity of the nozzle to one end of the second passage-way, and another conduit extending from the other end of the second passage-way to the nozzle, and an adjustable material deflecting member at the juncture of the first conduit and the nozzle.

11. In a bag filling machine, the combination with a material containing hopper and a material delivery nozzle extending from the machine, of an endless belt having a main groove and a pair of secondary grooves in its outer face and positioned to receive material from the hopper in its main groove and to delivery such material towards the nozzle, another belt in contact with the first belt and having a material carrying groove in its outer face and extending parallel with the lower portion of the first belt so that the main groove in the first belt and the groove in the second belt form a moving material containing return passage-way, a substantially U shaped trough extending from the vicinity of the nozzle to the passage-way formed by the two belts, a second substantially U shaped trough extending from such passage-way to the hopper, said troughs having their edges extending into the secondary grooves in the first belt, and adjustable material deflecting means positioned at the juncture of the first trough and the nozzle.

HENRY STINSON JOHNS.